United States Patent [19]

Maeda

[11] Patent Number: 5,011,519
[45] Date of Patent: Apr. 30, 1991

[54] IN-LINE FILTER AND TRAP STRUCTURE DEVICE FOR COMPRESSED AIR

[75] Inventor: Sadao Maeda, Okazaki, Japan

[73] Assignees: Maeda Shell Service Co., Ltd.; J & M Co., Ltd., both of Aichi, Japan

[21] Appl. No.: 439,682

[22] Filed: Nov. 21, 1989

[30] Foreign Application Priority Data

Nov. 24, 1988 [JP] Japan .................. 63-152662[U]

[51] Int. Cl.⁵ .............................................. B01D 19/00
[52] U.S. Cl. .......................................... 55/216; 55/323; 55/431; 55/466
[58] Field of Search .................. 55/323, 466, 431, 216

[56] References Cited

U.S. PATENT DOCUMENTS

| | | | |
|---|---|---|---|
| 3,418,789 | 12/1968 | Hoffman et al. | 55/219 |
| 4,487,618 | 12/1984 | Mann | 55/323 |
| 4,874,408 | 10/1989 | Overby | 55/466 |
| 4,897,094 | 1/1990 | Maeda | 55/323 |

FOREIGN PATENT DOCUMENTS 2194463 3/1988 United Kingdom .

Primary Examiner—Bernard Nozick
Attorney, Agent, or Firm—Oliff & Berridge

[57] ABSTRACT

In-line filter device including a first and a second filter disposed parallel with each other on a trap structure such that the filters communicate with a trap chamber defined in the trap structure, so that water and/or oil vapor contained in compressed air flowing through the first filter are coalesced into droplets, which are captured in the trap chamber, while any remaining liquid particles in the air are vaporized during passage through the second filter. The device has a reduced-pressure sump in the bottom portion of the trap structure, and inlet holes through which the captured liquid flows from the trap chamber into the sump such that an upper open end of the tube is positioned in a flow path of the air between the trap chamber and the second filter, for sucking the atmosphere in the sump toward the second filter. A draining device is provided in the bottom portion of the sump, for discharging the liquid out of the sump.

3 Claims, 2 Drawing Sheets

IN-LINE FILTER AND TRAP STRUCTURE DEVICE FOR COMPRESSED AIR

BACKGROUND OF THE INVENTION

1. Field of the Invention

The present invention relates in general to an in-line filter device connected to a compressed air line, and more particularly to such an in-line compressed air filter device having an improved structural arrangement, which is capable of efficiently preventing retaking or re-evaporation of trapped or separated liquid particles such as water and oil which have been contained in a compressed air stream, and which assures improved efficiency of removal of the liquid particles from the compressed air line.

2. Discussion of the Prior Art

Conduits used for supplying compressed air to various pneumatically operated components employed in various factories, atomic plants and medical equipment, for example, are generally provided with an in-line filter device or vapor trap assembly for removing water and/or oil vapor contained in a stream of compressed air, for the purpose of protecting the pneumatic components or improving the performance of those components.

A type of such an in-line filter device for compressed air, which minimizes vapor and/or liquid particles contained in the compressed air, has been disclosed in U.S. Pat. No. 4,487,618 to David O. Mann. The disclosed filter device includes first filter means having a suitable first packing inside a sleeve thereof, and second filter means having a suitable second packing inside a sleeve thereof. The first and second filter means are disposed parallel with each other, so as to extend in the vertical direction from an air-tightly enclosed trap structure having a suitable volume capacity, such that each of the first and second filter means communicates with an enclosed volume or trap chamber formed within the trap structure. The compressed air is directed to the trap chamber through the first filter means from an intake conduit, so that vapor (oil vapor) and/or liquid particles contained in the compressed air are condensed or coalesced into droplets, whereby the vapor and/or liquid particles are separated from the compressed air, and the droplets are captured within the trap chamber. Subsequently the compressed air from which the vapor and/or liquid particles have been separated is directed to an outlet conduit through the second filter means from the trap chamber, so that any remaining liquid particles are vaporized. Thus, the amount of the vapor and/or liquid particles entrained in the air entering the outlet conduit is minimized.

In the in-line filter device as described above, the liquid separated from the compressed air should be efficiently discharged from the filter device, without lowering the pressure of the air flowing through the filter device. For this purpose, a drain hole which is provided at the bottom portion of the trap chamber is suitably provided with a drain valve as disclosed in laid-open Publication No. 45-36182 of examined Japanese Patent Application (corresponding to U.S. Pat. No. 3,418,789) or other suitable draining means. The drain valve disclosed in the above publication is automatically opened to discharge the trapped liquid (collected droplets) when the liquid is accumulated to a predetermined volume.

In the filter device wherein the trapped droplets are discharged by means of such a drain valve, however, the liquid always stays in a given amount in the bottom space of the filter device. Thus, the liquid tends to be re-taken by the compressed air flowing through the trap chamber or tends to be re-vaporized, so that the liquid is returned into the compressed air stream, whereby the efficiency of removal of the liquid particles from the compressed air is lowered.

SUMMARY OF THE INVENTION

The present invention has been developed in view of the above-described situations. It is therefore an object of the present invention to provide an improved in-line filter device wherein the re-taking or re-evaporation of the trapped liquid particles such as water and/or oil vapor is effectively prevented, to permit improved efficiency of removal or separation of the liquid particles from the compressed air line.

The above object may be accomplished according to the present invention, which provides an in-line filter device for compressed air including first filter means which has a suitable first packing in a sleeve thereof, and second filter means which has a suitable second packing in a sleeve thereof, the first and second filter means being disposed parallel with each other on an air-tightly enclosed trap structure, such that the first and second filter means extend in a vertical direction from the trap structure and communicate with a trap chamber defined within the trap structure, the compressed air being introduced from an intake conduit into the trap chamber through the first filter means, whereby vapor and/or liquid particles contained in the compressed air are condensed or coalesced and captured within the trap chamber, the compressed air from which the vapor or liquid particles have been separated being directed from the trap chamber into an outlet conduit through the second filter means, whereby the liquid particles remaining in the compressed air are vaporized, the present filter device comprising: (a) a sump portion provided as part of a bottom portion of the trap structure, and defining an enclosed reduced-pressure sump; (b) inlet holes through which the liquid which has been separated from the compressed air and captured in the trap chamber flows into the reduced-pressure sump; (c) a venturi tube which extends from the reduced-pressure sump such that one of opposite ends of the tube remote from the sump is positioned in a path of the air along which the air flows from the trap chamber into the second filter means, the venturi tube sucking an atmosphere inside the reduced-pressure sump into the second filter means by an effect of the compressed air which flows from the trap chamber into the second filter means; and (d) drain means provided in a bottom portion of the reduced-pressure sump, for discharging out of the reduced-pressure sump the trapped liquid introduced from the trap chamber into the reduced-pressure sump through the inlet holes.

In the in-line filter device of the present invention constructed as described above, the separated liquid trapped or captured in the trap chamber of the filter device is rapidly introduced into the reduced-pressure sump from the trap chamber through the inlet holes, under the suction of air from the reduced-pressure sump through the venturi tube. Thus, the trapped liquid (droplets) only momentarily stays in the trap chamber through which the compressed air flows toward the second filter means. Hence, the conventionally encountered re-taking or re-evaporating of the liquid is avoided or minimized. Therefore, the instant filter device assures further improved efficiency and stability of removal of the liquid particles from the compressed air.

The bottom portion of the trap structure may include a base which comprises a flat portion from which the sump portion extends in a direction away from the trap chamber, so as to define the reduced-pressure sump. In this case, an inner surface of the flat portion is preferably inclined so that the trapped liquid falling thereon flows into the reduced-pressure sump through the inlet holes.

The filter device may further comprise a hood which cooperates with the sump portion to define the reduced-pressure sump. In this case, the venturi tube may be adapted such that the tube extends through and is supported by the hood such that the venturi tube further extends through the trap chamber. The hood may have a conical portion whose diameter increases in a direction along the tube from the trap chamber toward the sump. The inlet holes are preferably provided near a small end of the conical portion of the hood.

The drain means is desirably an automatic draining device having a valve which is automatically opened when a volume of the liquid stored in the sump exceeds a predetermined value.

The suction of the atmosphere from the sump into the second filter means through the venturi tube may be controlled by adjusting a diameter of a communication hole which communicates with the second filter means and the trap chamber and in which the upper end of the venturi tube is positioned. In this case, the communication hole may be formed through a top wall of a case member of the trap structure which partially defines the trap chamber.

BRIEF DESCRIPTION OF THE DRAWINGS

The above and optional objects, features and advantages of the present invention will be better understood by reading the following detailed description of a presently preferred embodiment of the invention, when considered in conjunction with the accompanying drawings, in which.

DETAILED DESCRIPTION OF THE PREFERRED EMBODIMENT

Figure 1:
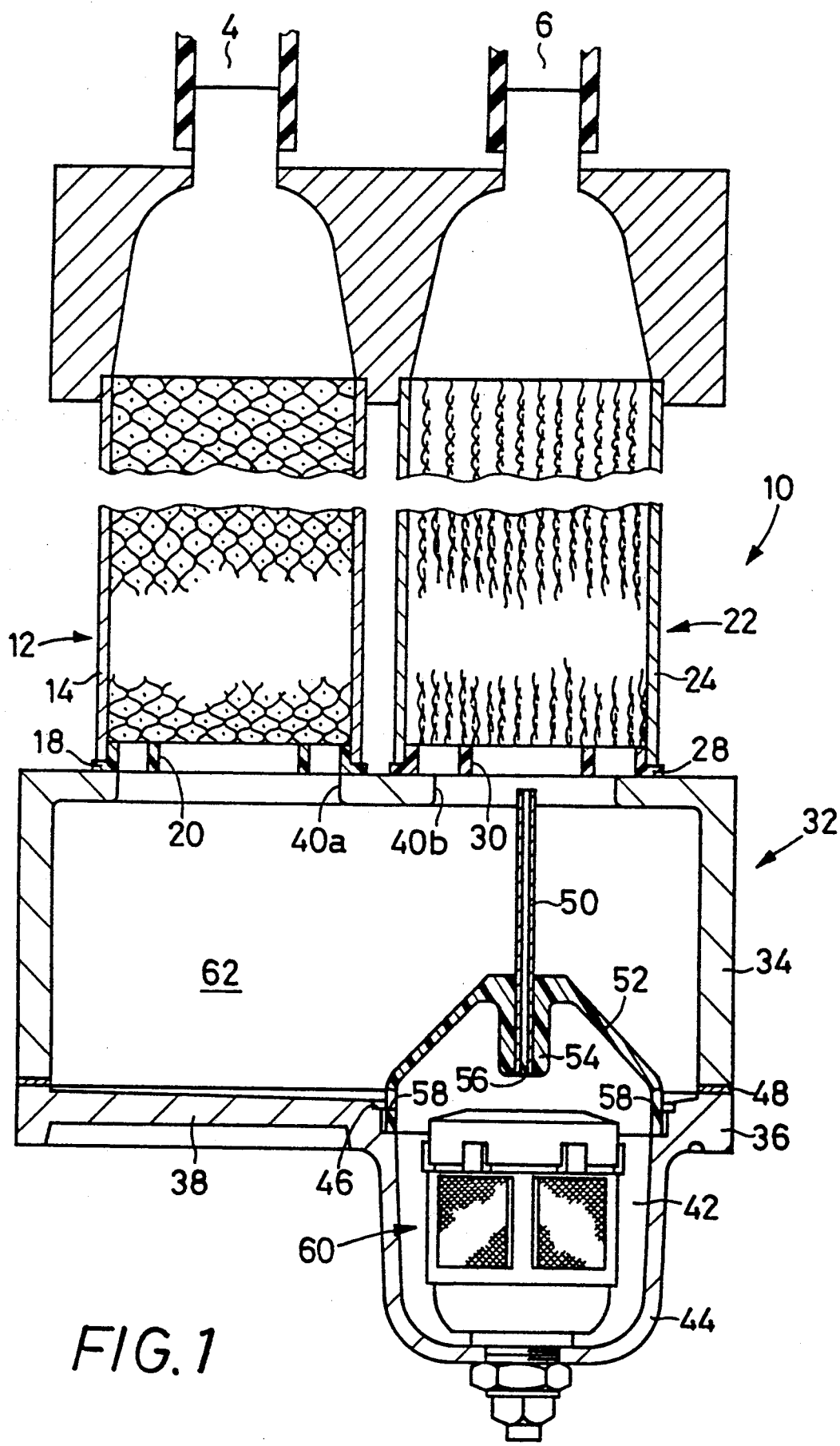
FIG. 1 is an elevational view in longitudinal cross section of an in-line filter device for compressed air constructed according to one embodiment of the present invention.

Referring first to FIG. 1, there is shown one embodiment of an in-line filter device of the invention connected to a compressed air line. In the figure, the filter device 10 consists of first and second filter means 12, 22, a trap structure 32 and a reduced-pressure sump 42. The trap structure 32 consists of a case member 34 and a base 36, and is connected to the lower open ends of the first and second filter means with bolts (not shown). The reduced-pressure sump 42 is formed as a lower bottom portion of the trap structure 32.

The first filter means 12 has a cylindrical sleeve 14 which is filled with a first packing 16 such as wound wire mesh fabrics formed of stainless steel fibers or plastic mesh, and two retainer plates 18 having a plurality of holes 20 which are inserted in the upper and lower open ends of the sleeve 14. Similarly, the second filter means 22 has a cylindrical sleeve 24 which is filled with a second packing 26 such as wound fabric material formed of cotton fibers or other absorbing materials, and retainer plates 28 having a plurality of holes 30 which are inserted in the upper and lower open ends of the sleeve 24.

The case member 34 is provided in an upper wall thereof with communication holes 40a, 40b. The case member 34 has a lower opening opposed to the upper wall. This opening is closed by the base 36, which has a flat portion 38, and a sump portion 44 defining a reduced-pressure sump 42 for accumulating liquid. Thus, a air-tightly enclosed trap chamber 62 having a predetermined capacity is formed within the case member 34, and the sump 42 is formed within the bottom sump portion 44 of the trap structure 32. In the figure, reference numeral 48 designates a packing for air-tight sealing between the case member 34 and the base 36.

The first and second filter means 12, 22 are bolted to the outer surface of the upper wall of the case member 34 which partially defines the trap structure 32, such that the first and second filter means 12, 22 are arranged so as to extend vertically parallel with each other, and such that the first and second filter means 12, 22 are aligned with communication holes 40a, 40b which are formed through the upper wall of the case member 34, respectively. Thus, the first and second filter means 12, 22 communicate with the trap chamber 62.

The above-described first and second filter means 12, 22 and the trap structure 32 are similar to those disclosed in U.S. Pat. No. 4,487,618 to David O. Mann.

In the filter device 10 constructed as described above, compressed air is initially directed through an inlet conduit 4, as shown in FIG. 1, into the first filter means 12 which has a larger cross sectional area for the air flow than the inlet conduit. While the compressed air is passed through the first filter means 12, vapor and/or liquid particles of water and oil contained in the compressed air are condensed or coalesced into droplets by adiabatic expansion of the compressed air and by passage of the air through the first packing 16. The thus condensed or coalesced droplets (liquid) are carried into the trap chamber 62 by gravity and by the compressed air, and captured within the chamber 62.

In the trap chamber 62, the condensation or coalescence of vapor contained in the compressed air is further effected by a further adiabatic expansion effect which is caused by a larger cross sectional area of the trap chamber 62 than that of the first filter means 12. The velocity of the compressed air which flows into the trap chamber 62 is lowered, whereby the liquid in the form of droplets in the compressed air is effectively separated from the compressed air and falls onto by gravity and centrifugal force, the surface of the flat portion 38 of the base 36.

Subsequently, the compressed air from which the vapor or liquid particles have been thus separated by the condensation and the coalescence is introduced into the second filter means 22 having a smaller cross sectional area than the trap chamber 62, whereby the air is subjected to adiabatic compression. Further, due to turbulence of the compressed air flow during passage through the structure of the second filter means 22, water and oil remaining in the compressed air as liquid particles are vaporized substantially completely. Oils are also absorbed by the second packing 26 in the second filter means 22. Thus, the compressed air substantially free from water and oil particles is returned to the compressed air line through an outlet conduit (not shown).

In the filter device 10 of the present embodiment, the base 36 consists of the flat portion 38 and the sump portion 44. The flat portion 38 is inclined by a small angle relative to the horizontal plane so that the droplets which have fallen thereon flow into the reduced-pressure sump 42. The sump 42 has a predetermined depth for accumulating the liquid In the sump 42, there is disposed an automatic draining device 60. The sump 42 is covered with a hood 52 having a conical trapezoid configuration, such that a larger diameter bottom end portion of the hood 52 threadedly engages a tapped portion 46 provided at an upper end portion of the sump portion 44. Thus, the air-tightly enclosed reduced-pressure sump 42 having a predetermined capacity is defined by the hood 52 and the sump portion 44.

The hood 52 which partially defines the reduced-pressure sump 42 of the present filter device 10, is formed with an integral protrusion 54 which protrudes inwardly in the reduced-pressure sump 42 from the center of the top portion of the hood 52 by a predetermined length along the axis of the hood 52. The protrusion 54 is provided with a bore 56 which extends through the radially central portion of the protrusion 54 along the axis thereof. The bore 56 receives a lower portion of a venturi tube 50 having a predetermined length. The upper portion of the venturi tube 50 projects from the hood 52 through the trap chamber 62 of the trap structure 32. The upper end of the tube 50 is positioned at or adjacent to the point of communication between the second filter means 22 and the trap chamber 62. In the present embodiment, the upper end of the tube 50 is open in the communication hole 40b of the case member 34, so that the upper open end of the tube 50 is positioned in a flow path along which tee air flows from the trap chamber 62 into the second filter means 22. The other open end of the venturi tube 50 is in communication with the reduced-pressure sump 42, with the protrusion 54 protruding toward the automatic draining device 60.

The hood 52 is further provided with a plurality of inlet holes 58 through which the liquid trapped in the trap chamber 62 flows into the sump 42. That is, the holes 58 are formed right above the tapped portion 46. Thus, the droplets separated from the compressed air and falling on the surface of the flat portion 38 of the base 36 are introduced into the reduced-pressure sump 42 through the inlet holes 58.

Since there is provided with the automatic draining device 60 inside the sump portion 44 which defines the reduced-pressure sump 42, the liquid (droplets) which is introduced into the reduced-pressure sump 42 through the inlet holes 58 and stored in the bottom portion of the sump 42, is automatically discharged from time to time, out of the filter device 10 by the draining device 60.

Figure 2:
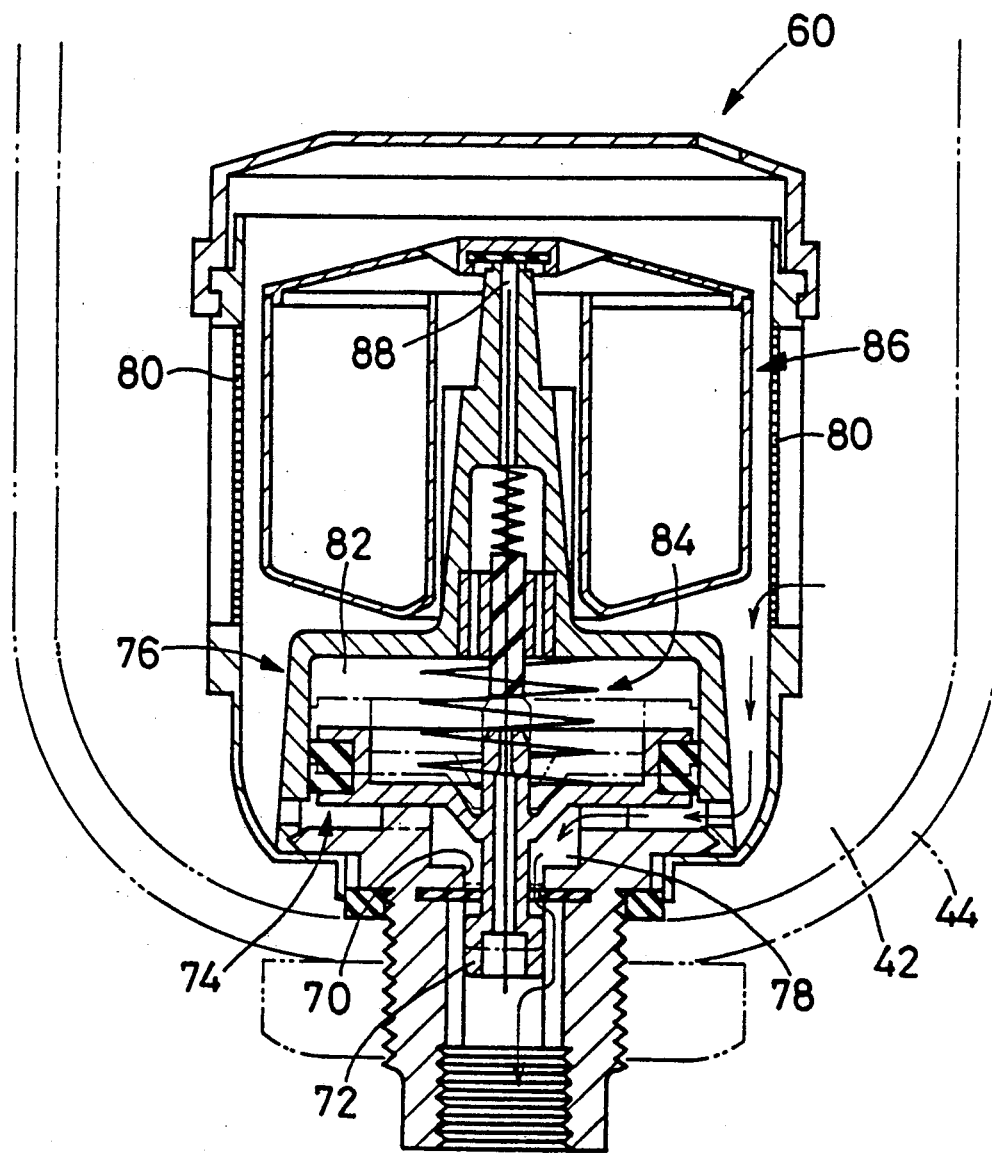
FIG. 2 is an elevational view in longitudinal cross section of an automatic draining device incorporated in the reduced-pressure sump of the filter device of FIG. 1.

As shown in FIG. 2, the automatic draining device 60 has screens 80 of network structure, through which the air and the liquid from the trap structure 62 (in the sump 42) are introduced into the interior of the draining device 60. In the lower portion of the device 60, there is disposed a piston 74 which is slidably received within a cylinder 76. The piston 74 is provided with an integrally formed valve 72 adapted to open and close a drain port 70 which extends through the bottom wall of the sump portion 44. The piston 74 is moved between a lower position (indicated in solid line in the figure) in which the drain port 70 is opened to discharge the trapped liquid and others, and an upper position (indicated in one dot chain line in the figure) in which the drain port 70 is closed.

The piston 74 is normally held in its upper closed position against a biasing force of a coil spring 84, with a pressure in the reduced-pressure sump 42 applied to a lower cylinder chamber 78 of the cylinder 76. When a float 86 is moved upward by a predetermined volume of the trapped liquid mass introduced into the reduced-pressure sump 42 from the trap structure 32, an upper cylinder chamber 82 of the cylinder 76 is brought into communication with the interior of the reduced-pressure sump 42 through an air passage 88. As a result, the piston 74 receives a pressure of the air in the upper cylinder chamber 82 as well as the biasing force of the coil spring 84, whereby the piston 74 is moved to its lower open position.

With the piston 74 moved to the lower open position, the drain port 70 is opened, and the liquid stored in the reduced-pressure sump 42 is discharged out of the sump 42 in a relatively short time under the pressure in the reduced-pressure sump 42. The flow path of the liquid is indicated by arrows in FIG. 2. When the volume (surface level of the liquid) of the liquid stored in the reduced-pressure sump 42 is reduced by a suitable amount, the float 86 is lowered, whereby the air passage 88 communicating with the interior of the reduced-pressure sump 42 is closed, whereby the piston 74 is raised and the drain port 70 is closed.

Because the construction and operation of the above-indicated automatic draining device 60 are well known in the art, as disclosed in the above-identified laid-open Publication No. 45-36182 (corresponding to the above-identified U.S. Pat. No. 3,418,789), no further description of the device 60 is deemed necessary.

The venturi tube 50 extends from inside the reduced-pressure sump 42 into the communication hole 40b formed through the top wall of the case member 34 for communication between the trap structure 32 and the second filter means 22, such that the upper open end of the venturi tube 50 is held in communication with the communication hole 40b in the upward direction, that is, in the direction of flow of the compressed air into the second filter means 22. Consequently, there arises a difference between the pressures adjacent to the upper and lower open ends of a restricted flow passage constituted by the venturi tube 50. This pressure difference causes a continuous suction of the atmosphere (air) from the reduced-pressure sump 42 into the second filter means 22, through the venturi tube 50.

As a result of the above-mentioned suction of the atmosphere from the reduced-pressure sump 42 into the second filter means 22 through the venturi tube 50, the pressure in the reduced-pressure chamber 42 is reduced, and there is generated a permanent flow of the air from the trap chamber 62 into the reduced-pressure sump 42 through the inlet holes 58. With this air flow, the droplets (liquid) which have been separated from the compressed air in the trap chamber 62 and fallen onto the flat portion 38 of the base 36, are rapidly and easily introduced by suction into the reduced-pressure sump 42.

Since the amount of air flow inside the reduced-pressure sump 42, especially in the bottom portion of the reduced-pressure sump 42, is sufficiently smaller than that inside the trap chamber 62, re-evaporation of the droplets within the reduced-pressure sump 42 is substantially avoided. Further, since the inlet holes 58 are disposed at the bottom end portion of the hood 52 which are remote from the protrusion 54, the droplets are effectively prevented from entering into the venturi tube 50.

In the filter device of the present embodiment equipped with the reduced-pressure sump 42 constructed as described above, the liquid trapped in the trap chamber 62 is rapidly collected into the reduced-pressure sump 42 under the suction of the air into the reduced-pressure sump 42. Thus, the conventionally experienced re-taking or re-evaporation of the trapped liquid is minimized, whereby the efficiency of removal of the liquid particles from the compressed air is effectively improved and stabilized.

Further, in the filter device of the present embodiment, the reduced-pressure sump 42 is defined by the sump portion 44 for storing the liquid, which sump portion 44 is provided by the base 36 which partially defines the trap chamber 62, and the hood 52 covers the sump 42. This arrangement effectively permits the filter device to be compact and small-sized.

In the filter device 10 of the present embodiment, each of the first and second filter means 12, 22 which are connected to the compressed air line (not shown), is adapted to be detachable from the trap structure 32. Thus, the first and second packings 16, 26 can be readily taken out after the first and second filter device 12, 22 are removed from the trap structure 32, whereby the packings 16, 26 can be easily replaced with new ones, independently of each other, resulting in easy maintenance of the filter device 10.

While the present invention has been described in detail in its presently preferred embodiment, for illustrative purpose only, it is to be understood that the invention is not limited to the details of the illustrated embodiment.

For example, it is possible to control the effect of suction of the air from the trap chamber 62 into the reduced-pressure sump 42 through the inlet holes 58 of the hood 52 by, for example, adjusting the inner diameter of the communication hole 40b of the case member 34, in which the upper end of the venturi tube 50 is open.

Further, the means for discharging the liquid from the reduced-pressure sump 42 is not limited to the automatic draining device 60 having the above illustrated construction, but may be replaced with other various known devices, such as a drain valve as disclosed in laid-open Publication No. 62-99313 of unexamined Japanese Utility Model Application.

It is to be understood that the present invention may be embodied with various changes, modifications, and improvements which may occur to those skilled in the art, without departing from the spirit and scope of the present invention.

What is claimed is:

1. An in-line filter and trap structure device for compressed air comprising first filter means which has a suitable first packing in a sleeve thereof, and second filter means which has a suitable second packing in a sleeve thereof, the first and second filter means being disposed parallel with each other on an air-tightly enclosed trap structure such that the first and second filter means extend in a vertical direction from a top wall of the trap structure, the trap structure having a trap chamber defined therewithin, and having a first and a second communication holes formed through a top wall of the trap chamber, the first and second filter means communicating with the trap chamber through the first and second communication holes, respectively, the compressed air being introduced from an intake conduit into the trap chamber through the first filter means, whereby vapor an/or liquid particles contained in the compressed air are condensed or coalesced and captured within the trap chamber, the compressed air from which the vapor or liquid particles have been separated being directed from the trap chamber into an outlet conduit through the second filter means, whereby the liquid particles remaining in the compressed air are vaporized, said trap structure including a base which has a flat portion, and a sump portion which extends from said flat portion in a direction away from said trap chamber, so as to define a recess;

a conical hood which cooperates with said sump portion to define a reduced-pressure sump, said conical hood having a diameter which increases in an axial direction of said conical hood from said trap chamber toward said recess;

said conical hood having inlet holes formed through a large end portion thereof;

said flat portion having an inner surface which is inclined so that the liquid which has been separated from the compressed air and fallen on said inner surface is introduced into said reduced-pressure sump through said inlet holes, while flowing on an inner surface of said sump portion;

a venturi tube which is supported by and extends through a small end portion of said hood such that one end of said tube is positioned in said reduced-pressure sump, and the second end of said tube is positioned in said second communication hole through which the air flows from the trap chamber into said second filter means, said venturi tube sucking an atmosphere inside said reduced-pressure sump into said second filter means by an effect of the compressed air which flows from said trap chamber into said second filter means through said second communication hole; and drain means provided in a bottom portion of said reduced-pressure sump, for discharging out of the reduced-pressure sump the trapped liquid introduced from said trap chamber into said reduced-pressure sump through said inlet holes.

2. A filter device according to claim 1, wherein said drain means comprises an automatic draining device having a valve which is automatically opened when a volume of the liquid stored in said sump exceeds a predetermined value.

3. A filter device according to claim 1, wherein the suction of the atmosphere from said sump into said second filter means through said venturi tube is controlled by said second diameter of a communication hole in which the second end of the venturi tube is positioned.

* * * * *